(12) United States Patent
Salonidis et al.

(10) Patent No.: US 8,305,954 B2
(45) Date of Patent: Nov. 6, 2012

(54) METHOD AND DEVICE FOR TIME SYNCHRONIZATION IN A TDMA MULTI-HOP WIRELESS NETWORK

(75) Inventors: Theodoros Salonidis, Paris (FR); Dimitrios Koutsonikolas, West Lafayette, IN (US); Henrik Lundgren, Le Plessis Robinson (FR)

(73) Assignee: Thomson Licensing, Issy-les-Moulineaux (FR)

( * ) Notice: Subject to any disclaimer, the term of this patent is extended or adjusted under 35 U.S.C. 154(b) by 720 days.

(21) Appl. No.: 12/456,973

(22) Filed: Jun. 25, 2009

(65) Prior Publication Data
US 2009/0323669 A1    Dec. 31, 2009

(30) Foreign Application Priority Data
Jun. 25, 2008 (EP) .................................... 08305323

(51) Int. Cl.
*H04B 7/212* (2006.01)
*H04J 3/00* (2006.01)
*H04J 3/06* (2006.01)
*H04L 12/28* (2006.01)

(52) U.S. Cl. ... 370/321; 370/336; 370/350; 370/395.62; 370/503

(58) Field of Classification Search .................. 370/230, 370/254–258, 350, 321, 336, 445
See application file for complete search history.

(56) References Cited

U.S. PATENT DOCUMENTS

| 7,263,090 B2 * | 8/2007 | Cronin et al. ................. 370/350 |
| 2005/0185628 A1 * | 8/2005 | Watanabe et al. ............. 370/347 |
| 2005/0287989 A1 * | 12/2005 | Lee ............................... 455/411 |
| 2006/0114826 A1 * | 6/2006 | Brommer ...................... 370/230 |
| 2006/0245440 A1 | 11/2006 | Mizukoshi |

(Continued)

FOREIGN PATENT DOCUMENTS
WO    WO 2006/056174    6/2006

OTHER PUBLICATIONS

Mingxia Xu et al. Lightweight and energy efficient time synchronization for sensor network vol. 2, Sep. 23, 2005, pp. 947-950, XP010856304.

(Continued)

*Primary Examiner* — Brandon Renner
(74) *Attorney, Agent, or Firm* — Myers Wolin, LLC

(57) ABSTRACT

The invention concerns a method for synchronizing clocks of a set of nodes in a TDMA ("Time Division Multiple Access") communication network comprising a plurality of nodes, among which some called time reference (TR) nodes are synchronized to a common time reference through a predetermined out-of-band synchronization mechanism, other nodes being called non-TR nodes, each node comprising an internal clock, characterized in that it comprises the steps of:
  transmitting, at the level of at least one of said TR nodes, a broadcast beacon packet during a given time slot of sub-frames, each sub-frame comprising a plurality of time slots;
  propagating among the remaining nodes said beacon packet using the slotted structure of the TDMA protocol, each node being pre-assigned a conflict-free time slot in a sub-frame to broadcast said beacon packet received from another node in a previous slot of said sub-frame; and
  updating in at least two of said non-TR nodes the internal clock based on an updated offset estimate, upon reception of said beacon packet.
The invention also concerns a communication device in a TDMA communication network.

16 Claims, 3 Drawing Sheets

U.S. PATENT DOCUMENTS

| | | | |
|---|---|---|---|
| 2007/0013419 A1* | 1/2007 | Ayyagari et al. | 327/156 |
| 2008/0129881 A1* | 6/2008 | Shao et al. | 348/723 |
| 2008/0152046 A1* | 6/2008 | Armstrong et al. | 375/343 |
| 2008/0165761 A1 | 7/2008 | Goppner | |
| 2008/0279155 A1* | 11/2008 | Pratt et al. | 370/336 |
| 2010/0091760 A1* | 4/2010 | Yoon | 370/350 |
| 2010/0238890 A1* | 9/2010 | Mo et al. | 370/329 |

OTHER PUBLICATIONS

Ganeriwal S. et al. "Timing-sync Protocol for sensor networks" vol. Conf. 1, Nov. 3, 2003, pp. 1-12, XP002459888.

Elson J. et al. "Reference Broadcast synchronization (RBS): Fine grained network time synchronization using reference broadcast" Dec. 1, 2002 pp. 1-17, XP002459887.

Search Report Dated Nov. 20, 2008.

* cited by examiner

METHOD AND DEVICE FOR TIME SYNCHRONIZATION IN A TDMA MULTI-HOP WIRELESS NETWORK

This application claims the benefit, under 35 U.S.C. §119, of European Patent Application No. 08305323 filed 25 Jun. 2008.

BACKGROUND OF THE INVENTION

1. Field of the Invention

The present invention pertains to the field of communication networks.

The present invention more particularly relates to TDMA ("Time Division Multiple Access") multi-hop wireless networks.

2. Description of the Prior Art

In a multi-hop wireless network, a set of nodes equipped with wireless interfaces form a network infrastructure where data is forwarded through multiple wireless hops toward intended destinations. Initially used in military applications such as ad hoc networks, the multi-hop wireless communication paradigm is now applied to emerging commercial applications such as mesh networks, sensor networks, personal area networks and wireless wide area networks.

The present invention considers a multi-hop wireless network where transmissions are coordinated by a Time Division Multiple Access (TDMA) protocol. TDMA protocols are attractive because they can provide bandwidth and delay guarantees through conflict-free, periodic transmission schedules. They are currently being considered by emerging multi-hop wireless standards such as IEEE 802.16j Mobile Multi-Hop Relay [IEEE 802.16's Mobile Multihop Relay (MMR) Study Group, http://www.ieee802.org/16/sg/mmr/] that aim at enhancing the coverage of current single-hop IEEE 802.16 wireless systems and also address the well-known performance problems encountered by existing Carrier Sense Multiple Access (CSMA) protocols in multi-hop wireless environments.

In a TDMA protocol, all nodes are synchronized to a common time reference and transmissions occur periodically in a sequence of multi-slot frames. Each frame consists of a control sub-frame followed by a data sub-frame. Both sub-frames are of fixed duration and consist of several time slots. During each control sub-frame, various management functions are performed including synchronization and schedule computation/dissemination. During each slot of the data sub-frame, some nodes transmit conflict-free according to a network schedule that has been computed during a preceding control sub-frame. The schedule computation can be either decentralized (computed by the nodes) or centralized (computed and disseminated to the nodes by a single node that acts as network controller).

Central to the operation of any TDMA protocol is the synchronization mechanism that keeps the node clocks synchronized to a common time reference. This time reference enables nodes to transmit at each slot based on the network schedule. In case of centralized scheduling, it also enables the controller node to compute a network-wide conflict-free schedule that provides bandwidth and delay guarantees to all nodes in the network. The synchronization mechanism for any TDMA system should be highly acccurate, have bounded execution time (delay) and low overhead, be inexpensive and be widely applicable. Below, we describe these features in more detail and discuss their impact on TDMA protocol performance.

In practice, the node clocks can never be perfectly synchronized. A highly accurate synchronization mechanism should minimize all node clock drifts from the common time reference. It should also bound all clock drifts to enable the (offline) design of TDMA MAC protocol parameters such as slot guard time, which is a constant per-slot overhead during TDMA protocol operation. A highly-accurate synchronization mechanism should result in low per-slot guard time, therefore, small slot duration. Small slot duration yields small frame duration, which translates to low delay. It also enables control of transmissions at a fast time scale, which translates to efficient protocol operation.

The clock synchronization mechanism is executed during the control sub-frame and its execution time is a per-frame overhead. This overhead must be both bounded and minimized to enable optimal design of TDMA MAC protocol parameters such as the duration of the control sub-frame, which is fixed during the TDMA protocol operation.

The synchronization mechanism should not incur excessive additional cost to the wireless system.

Ideally, the synchronization mechanism should apply to different wireless environments (indoor/outdoor), different types of multi-hop wireless networks (mesh networks, personal area networks, sensor networks) and different types of devices (wireless routers operating within the infrastructure or clients operating at the wireless network edge).

No existing synchronization mechanism for multi-hop wireless networks can support all the above features.

Existing synchronization mechanisms can be broadly classified to out-of-band or in-band. Out-of-band synchronization mechanisms enforce a common time reference using additional hardware. For example, clock synchronization can be achieved at high accuracy if all wireless nodes are tuned to an external global clock through Global Positioning System (GPS) devices. This approach is not widely applicable because GPS devices are expensive and only work in outdoor environments with clear sky view.

In-band synchronization mechanisms attempt to synchronize the node clocks by sending beacon synchronization messages within the network. The simplest version of in-band synchronization mechanisms operate in today's wireless systems of star topology where a server node provides single-hop wireless access to fixed or mobile client nodes. Examples are GSM/TDMA cellular networks, satellite systems, IEEE 802.16 broadband wireless systems, IEEE 802.11 wireless LANs using the Point Coordination Function (PCF) or Bluetooth systems. In these single-hop wireless TDMA systems, time synchronization can be achieved by periodic broadcast transmissions of a signal or beacon packet from the server to all clients (see for instance U.S. Pat. No. 7,263,590 "System and method of timing and frequency control in TDM/TDMA networks"). This method cannot be applied to multi-hop wireless networks because a node providing network time reference cannot reach all other nodes with a single broadcast transmission.

A potential way to develop in-band synchronization mechanisms for multi-hop wireless networks is to adapt synchronization mechanisms for multi-hop wireline networks. The Network Time Protocol (NTP) is the most well-known clock synchronization mechanism currently used in the Internet [D. L. Mills. *"Internet Time Synchronization: The Network Time Protocol."* In Zhonghua Yang and T. Anthony Marsland (Eds.), Global States and Time in Distributed Systems, IEEE Computer Society Press, 1994.]. NTP signaling is considered heavyweight for the wireless environment-existing wireless adaptations of NTP yield low accuracy and high overhead, even for the simple case of single-hop wireless networks.

Some in-band clock synchronization algorithms have been proposed for multi-hop wireless sensor networks, including the following:

- J. Elson, L. Girod, and D. Estrin. *"Fine-Grained Network Time Synchronization Using Reference Broadcasts."* In Proc. 5th Symposium on Operating Systems Design and Implementation (OSDI), 2002.
- S. Ganeriwal, R. Kumar, and M. Srivastava. *"Timing-sync Protocol for Sensor Networks."* In SENSYS, November 2003.
- Q. Li and D. Rus. *Global Clock Synchronization in Sensor Networks*, 2004.
- M. Maroti, B. Kusy, G. Simon, and A. Ledeczi. *"The Flooding Time Synchronization Protocol."* In ACM SenSys 2004, 2004.
- M. Mock, R. Frings, E. Nett, and S. Trikaliotis. *"Continuous Clock Synchronization in Wireless Real-Time Applications."* In Symposium on Reliability in Distributed Software, 2000.
- K. Romer. *"Time Synchronization in Ad Hoc Networks."* In ACM Symposium on Mobile Ad Hoc Networking and Computing (MobiHoc 01), Long Beach, Calif., October 2001.
- J. van Greunen, J. Rabaey, *"Lightweight Time Synchronization for Sensor Networks"*, In Proc. WSNA, September 2003, San Diego, Calif.
- M. Xu, M. Zhao and S. Li, *"Lightweight and energy efficient time synchronization for sensor network"*, In Proc. International Conference on Wireless Communications, Networking and Mobile Computing, 2005.

The above algorithms exploit the broadcast nature of the wireless medium to improve synchronization accuracy. However, they all use random access MAC protocols to disseminate the synchronization beacon packets in the network. Such protocols are not appropriate for TDMA systems because they introduce unpredictable delays and collisions that result in losses of synchronization beacon packets. Therefore such algorithms are not able to minimize or even bound the synchronization overhead. In addition, most of these algorithms have not been implemented and tested in real-world multi-hop wireless environments.

The IEEE 802.16 Relay Task group (802.16j standard) has specified an in-band synchronization mechanism for multi-hop 802.16 wireless systems that have a tree topology structure. This synchronization mechanism operates on top of the 802.16 TDMA protocol but is specific to a tree topology structure: synchronization preambles are disseminated from a central root node toward leaf nodes over the tree network structure. This mechanism cannot be applied to multi-hop wireless networks of general topology where parent-child roles are not known in advance. In addition, clock dissemination over a tree structure is subject to individual link failures: if at least one link fails to disseminate the preamble the synchronization algorithm fails to synchronize all nodes under a common time reference. Finally, the 802.16j draft standard only specifies general signaling and message exchanges but does not provide an algorithm to efficiently schedule the dissemination of synchronization signals so that the TDMA protocol conflict-free and bounded delay requirements are met.

- Relay Task Group of IEEE 802.16, "Part 16: Air Interface for Fixed and Mobile Broadband Wireless Access Systems Multihop Relay Specification", IEEE P802.16j/D3, Feb. 29 2008.

The ECMA High rate Ultra Wide Band PHY and MAC standard defines an in-band distributed clock synchronization mechanism that operates on top of a TDMA MAC protocol. In this mechanism, during each TDMA frame each node periodically broadcasts its clock to its one-hop neighbors and synchronizes its clock to the received clock value of its slowest one-hop neighbor. This "follow the slowest clock" method can synchronize nodes in a single-hop network where all nodes can hear each other. However, in a multi-hop wireless network, this algorithm would require an unbounded number of TDMA frames to propagate the slowest clock and create a common time reference for the entire network.

As a consequence, the algorithm disclosed in the ECMA standard does not provide a solution for applications where a global network time reference is needed in minimum time and bounded delay.

"Standard ECMA 368, High Rate Ultra Wideband PHY and MAC standard.", 2nd edition, December 2007.

Among the publications of the prior art, the PCT patent application No. WO 2006/056174 (Fraunhofer—Germany) discloses a synchronization and data transmission method. The synchronization method disclosed in that prior Fraunhofer PCT patent application does not satisfy the TDMA protocol requirements of bounded delay and low overhead, and does not apply to a multi-hop wireless environment.

SUMMARY OF THE INVENTION

The present invention aims at solving the above-mentioned drawbacks of the prior art solutions.

In contrast to existing approaches, the present invention introduces a synchronization algorithm that utilizes the TDMA protocol slotted structure. The synchronization algorithm disseminates a clock synchronization message that originates from a certain point in the network that provides the common time reference. The synchronization message is disseminated in the network using a conflict-free network schedule in the control sub-frame. This schedule is constructed in such a way that the synchronization message is disseminated to the entire network in minimum and finite time. The algorithm can be executed periodically across TDMA frames to refresh the node clocks according to the common time reference.

The technical problem the present invention seeks to solve is the following: how to provide a common time reference to all nodes in a TDMA multi-hop wireless network?

Currently, no existing algorithm can solve this problem in an efficient manner that can address the TDMA protocol requirements for bounded execution time and minimum overhead and also be widely applicable. GPS devices is an out of band solution that can only be applied outdoors with clear sky view and when cost is not an issue. In-band solutions are more widely applicable and cost-effective and utilize the network infrastructure to disseminate the clock synchronization messages. Most existing in-band synchronization solutions are for single-hop wireless networks of star topology. Some in-band solutions have been devised for TDMA multi-hop networks of tree topology (802.16j standard) which are not applicable to networks of arbitrary topology. On the other hand, some other in-band solutions have been devised for multi-hop wireless sensor networks of arbitrary topology but synchronization is performed using random access mechanisms which makes it infeasible to minimize or bound the overhead. Most of the proposed mechanisms have never been implemented and tested in a multi-hop wireless environment.

The present invention generally relates to synchronization of clocks of a set of nodes sharing a network and more particularly to clock synchronization mechanisms that create a common time reference for wireless nodes that execute TDMA protocols in a multi-hop wireless network. The clock synchronization algorithm utilizes the TDMA protocol slotted structure to disseminate a clock synchronization message that originates from a certain point in the network that provides the common time reference. The clock synchronization message is disseminated using a conflict-free network schedule in the control sub-frame. This schedule is constructed in such a way that the synchronization message is disseminated to the entire network in minimum time. The algorithm can be executed periodically across TDMA frames to refresh the node clocks according to the common time reference. It can be applied to a wide range of multi-hop wireless TDMA networks and provides accurate clock synchronization at low overhead. Finally, the algorithm can further be used to disseminate additional control information to the clock synchronization message from the nodes providing time reference to the rest of the nodes in the network.

The present invention is defined, in its broader sense, as a method for synchronizing clocks of a set of nodes in a TDMA ("Time Division Multiple Access") communication network comprising a plurality of nodes, among which some called time reference (TR) nodes are synchronized to a common time reference through a predetermined out-of-band synchronization mechanism, other nodes being called non-TR nodes, wherein it comprises the steps of:
  transmitting, at the level of at least one of said TR nodes, a broadcast beacon packet during a given time slot of sub-frames, each sub-frame comprising a plurality of time slots;
  propagating among the remaining nodes said beacon packet using the slotted structure of the TDMA protocol, each node being pre-assigned a conflict-free time slot in a sub-frame to broadcast said beacon packet received from another node in a previous slot of said sub-frame; and
  updating in at least two of said non-TR nodes the internal clock based on an updated offset estimate, upon reception of said beacon packet.

Advantageously, said method comprises a step, upon reception of said beacon packet by a node (B) from another node (A), of estimating the time when node (A) transmitted said beacon packet and a step of computing the offset between internal clock of node (A) and internal clock of node (B).

Preferably, said beacon packet comprises a timestamp with the current clock value of the TR node at the time when said beacon packet is transmitted by said TR node.

According to a particular embodiment, additional control information is disseminated from at least one of said TR nodes to at least two said non-TR nodes in said communication network.

Said additional control information is preferably disseminated in said beacon packet.

Advantageously, said sub-frames are Synchronization Control Sub-Frames (SCS), which are part of control sub-frames.

According to an embodiment, in a given time slot, only one node transmits and the remaining nodes are in "receive" mode.

Preferably, each time slot of said sub-frame is assigned to a node to transmit or propagate said beacon packet through said communication network.

According to an embodiment, when a node is assigned to transmit during a predetermined time slot of said sub-frame, at least one of its neighbor nodes has been assigned to transmit in the previous time slot.

Preferably, said method comprises steps of maintaining and updating a look-up table by at least one node, said look-up table being used to determine a value (delta) depending on the data rate value in said beacon packet.

According to a particular embodiment, said value (delta) is equal to the sum of the three following values: —MAC transmission delay at the sender;
  —propagation delay; and
  —MAC reception delay at the receiver.

According to an embodiment, said method comprises a step of providing a timestamp at a. transmitting node which is performed at a communication network protocol layer called MAC (Media Access Control) layer.

Preferably, said method comprises a step, performed at a communication network protocol layer called MAC (Media Access Control) layer, of receiving and decoding said beacon packet.

Advantageously, at least two sub-frames are associated with at least one channel number (k) and at least one time index (t) within the sub-frame, and in that, at time index (t), nodes that belong to a given group (j) of nodes switch to said channel (k) and perform at least one synchronization step.

According to an embodiment, there are two channel numbers and one time index (t), and one synchronization step is performed on each of the two channels at time index (t).

According to another embodiment, there is one single channel number and two distinct time indexes, and two synchronization steps are performed on said single channel at the two distinct time indexes.

Advantageously, said channel number (k) designates a communication channel among a plurality of orthogonal communication channels.

The present invention also concerns a communication device in a TDMA ("Time Division Multiple Access") communication network comprising a plurality of devices, among which some called time reference (TR) nodes are synchronized to a common time reference through a predetermined out-of-band synchronization mechanism, wherein it comprises means for:
  receiving a broadcast beacon packet, which had previously been transmitted during a given time slot of sub-frames, each sub-frame comprising a plurality of time slots;
  updating its internal clock based on an updated offset estimate, upon reception of said beacon packet; and
  re-broadcasting said beacon packet on an assigned transmission slot within a control-sub-frame, using the slotted structure of the TDMA protocol.

The advantages provided by the present invention are the following:
  Address the TDMA tight requirements of bounded execution time and minimum overhead. Each synchronization beacon is disseminated to the network in a number of time slots equal to P which is typically less than N, the number of nodes in the network.
  High accuracy. The implementation of the method according to the present invention over IEEE 802.11 hardware achieves clock synchronization in the order of a few microseconds.

BRIEF DESCRIPTION OF THE DRAWINGS

The following detailed description will be better understood with the drawings, in which.

DESCRIPTION OF THE PREFERRED EMBODIMENTS

Figure 1:
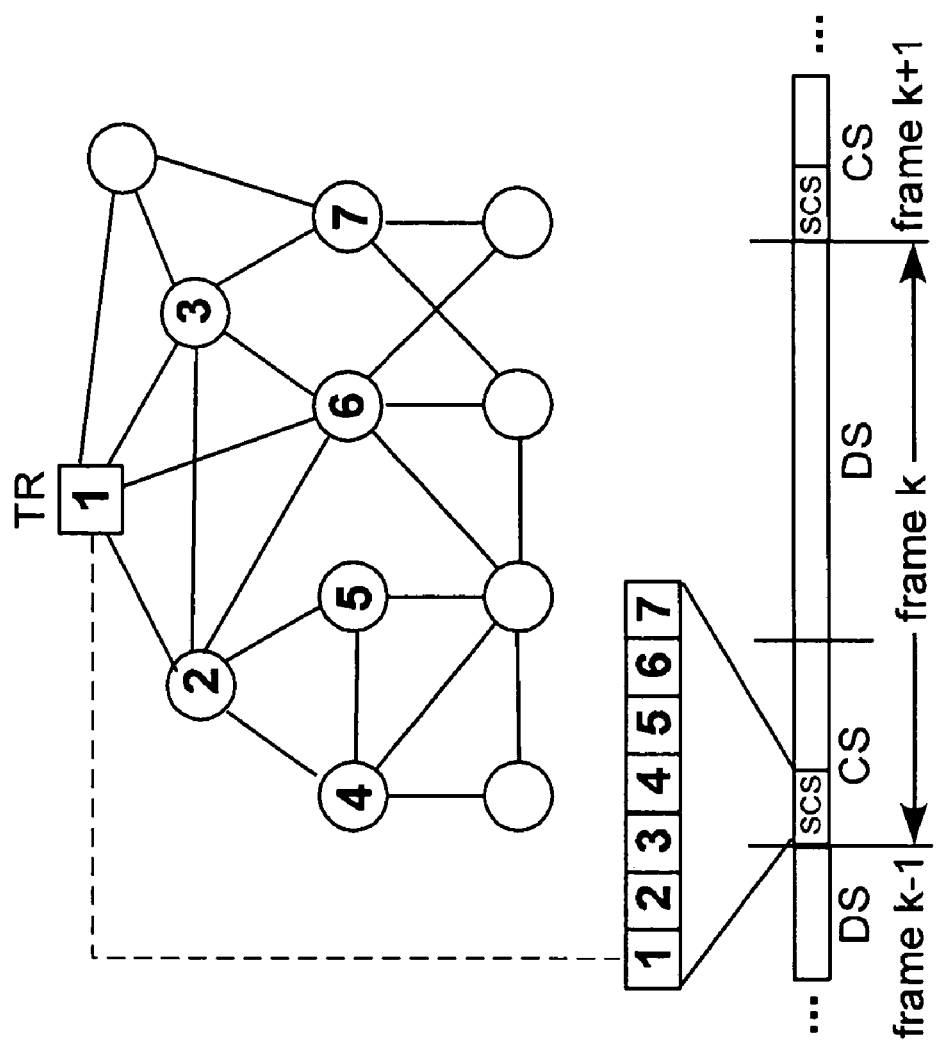
FIG. 1 shows an example of a Synchronization Control Sub-frame (SCS) schedule.

The method according to the invention can for instance be used in a multi-hop wireless network consisting of N nodes. In an embodiment, some of these nodes are time reference (TR) nodes. TR nodes are synchronized to a common time reference through an out-of band synchronization mechanism such as GPS (Global Positioning System) devices and atomic clocks. The aim of the synchronization algorithm in the present invention is to keep the clocks of all nodes in the network synchronized to the time reference of the TR nodes. The algorithm utilizes the TDMA protocol slotted structure to achieve accurate synchronization and minimize the communication overhead. It takes place during the Synchronization Control Sub-frame (SCS) which is part of the control sub-frame. The main idea is for the TR nodes to trigger synchronization by transmitting a broadcast beacon at the first slot of the SCS and have the rest of the nodes quickly propagate this beacon to the network while they update their estimates of the TR clock.

Without loss of generality, it is possible to first focus on the case of a single TR node. Later, performance enhancements that involve multiple TR nodes, will be discussed. We first describe the SCS structure that determines the node transmission sequence which aims at quick propagation of the TR synchronization beacon in the network. Then we present the synchronization algorithm that utilizes the SCS structure and an experimental parameter estimation procedure that aids in achieving acccurate clock synchronization.

The SCS schedule consists of P slots. During each slot, only a single node transmits and the rest are in "receive" mode. Each node transmits at most once during the SCS. The goal of constructing the SCS schedule is to find a slot assignment with small P that ensures that a single beacon message is propagated from the TR node to the rest of the nodes in the network in a reliable manner. The first SCS slot is assigned to the TR node to transmit the beacon packet to be propagated in the network. The rest SCS slots are assigned to other nodes to propagate the beacon using a network communication graph G(N,L) of the multi-hop wireless network. The vertices of graph G(N,L) are the network nodes and the edges are all uni-directional links (i,j) for which a transmission from node i can reach node j with probability p[i,j]. There are several ways to assign slots to nodes based on G(N,L). Any assignment should ensure that when a node is assigned to transmit at a slot, at least one neighbor node in G(N,L) has been assigned to transmit during a previous slot. This constraint arises because each node can transmit at most once during the SCS. The best assignment depends on the trade-off between overhead and reliability. Assignments with larger SCS duration P yield higher overhead and execution time. On the other hand, they may provide more reliability because there are more transmissions and nodes have a better chance to receive the beacon packet from their neighbors.

FIG. 1 shows an example of a Synchronization Control Sub-frame (SCS) schedule of P=7 slots for a multi-hop wireless network G(N,L) with N=12 nodes. The edges of the network graph G(N,E) denote communication on either direction of the link between the node endpoints. In this example, the algorithm is executed during the SCS at each control-subframe (lambda=1). The TR (time reference) node is assigned the first slot in the SCS. Numbers in nodes denote the slot where these nodes have been assigned to transmit during the SCS.

The algorithm description focuses on the maintenance of synchronization in a multi-hop wireless network with fixed number of nodes. Additional nodes can be incorporated in the algorithm execution after being added to the network through a ranging procedure similar to ranging procedures encountered in current wireless TDMA systems.

The goal of the algorithm is to update the clock values of the nodes so that synchronization with the TR node is maintained. The algorithm runs during the SCS and is executed periodically every lambda control sub-frames. The maximum frequency that the algorithm can be applied is determined by the duration of the TDM frame, F. In this case, the algorithm is applied at each control sub-frame (lambda=1).

Each slot in the SCS is of fixed duration equal to SlotTime. SlotTime consists of two parts of fixed duration: idle guard time part T_G and data transmission part. The guard time is a necessary per-slot overhead to mask instantaneous clock drifts. It is necessary to assume that the slot guard time T_G is large enough to absorb clock drifts for the duration P*SlotTime of the SCS. This ensures that all nodes are synchronized and have a common view of the start and end of all sub-frames (control, SCS, data) during the algorithm execution. T_G should also be large enough to mask drifts that occur in-between different algorithm executions at different TDMA frames. If dr_i is the clock drift rate of node i from the common time reference, the slot guard time should satisfy:

$$T_G \geq \lambda \max_{i \in N}(dr_i \cdot F), \lambda = 1, 2, \ldots$$

The algorithm begins when the TR node broadcasts a beacon containing a timestamp with its current clock value at the first slot of the SCS. Each node that receives the beacon, provided it is the first beacon it has received in the current SCS, computes an estimate of its clock offset to the TR clock and determines the beginning of the next Data Subframe (DS) based on the TR nodes's clock. It then re-broadcasts the beacon (unmodified) during its assigned slot in the SCS. The slot assignment ensures that, by the end of the SCS, all nodes are able to receive at least one copy of the beacon with high probability. At the end of the SCS, all nodes update their clocks based on their updated offset estimates. Below will be described in detail the offset computation upon reception of a beacon and the clock update actions performed by all nodes at the end of the SCS when the algorithm terminates.

We now describe the actions of each node n when it receives a beacon at a slot i. Let T_n(L) be the local clock value of node n when the beacon is received. Node n first computes an estimate T_i(L) of the time where node i sent the beacon:

$$T_i(L) = T_n(L) - \delta \quad (1)$$

where delta is an estimate of the total time it takes for a beacon to be transmitted from node i to node n. We will describe how delta is estimated in the next section. Given T_i(L), node n then computes its estimate T_s(L) of the time when the TR node sent the beacon:

$$T_s(L) = T_i(L) - (i-1) \text{SlotTime} \quad (2)$$

Finally, node n uses the beacon timestamp value T_s(R) to estimate its offset of the TR clock based on a sample from node i:

$$\text{Offset}(i) = T_s(R) - T_s(L) \quad (3)$$

At the end of slot P of the SCS, each node n updates its local clock based on the newly computed offset. The reason for all nodes to simultaneously update their clocks at the end of the SCS is to avoid desynchronization due to nodes updating their clocks with new clock values before others.

Estimation of Delta

The only unknown quantity in the offset estimation procedure of the synchronization algorithm is the delay delta in Eq. (1). delta is the total delay between the time the timestamp is placed in the beacon packet at the sender and the time of reception of the beacon packet at the receiver.

We consider, according to an embodiment, an implementaton where the timestamp operation at the sender side is performed at the MAC layer. At the receiver side, the reception and decoding of the beacon packet are also implemented at the MAC layer. Such an implementation bypasses delay uncertainties due to higher layers of the network protocol stack, such as operating system context switches and delays due to the network layer data path. In addition, the synchronization algorithm operates on top of a TDMA protocol and delta occurs within a time slot, hence no access delay due to the MAC protocol operation exists. This is in contrast to above-mentioned clock synchronization algorithms of the prior art that operate on top of random access protocols. In these prior art algorithms, the access delay component is significant and requires online estimation during the synchronization algorithm execution.

The only components of delta are MAC transmission delay at the sender, the propagation delay and MAC reception delay. The MAC transmission delay at the sender is deterministic and can be determined by the beacon packet size and the physical layer data transmission rate. The propagation delay for inter-node distances encountered in typical multi-hop wireless networks has both low magnitude and variability with respect to the time slot granularity of TDM protocol. For example, propagation delay over a half-kilometer is in the order of a fraction of micro-second, while in our TDM protocol implementation over IEEE 802.11 wireless hardware, the clock granularity is one micro-second. The primary unknown quantity is the MAC reception delay when the receiver radio interrupt arrives at the MAC layer. Although unknown, this quantity is also expected to be relatively small and of low variability.

Figure 2:
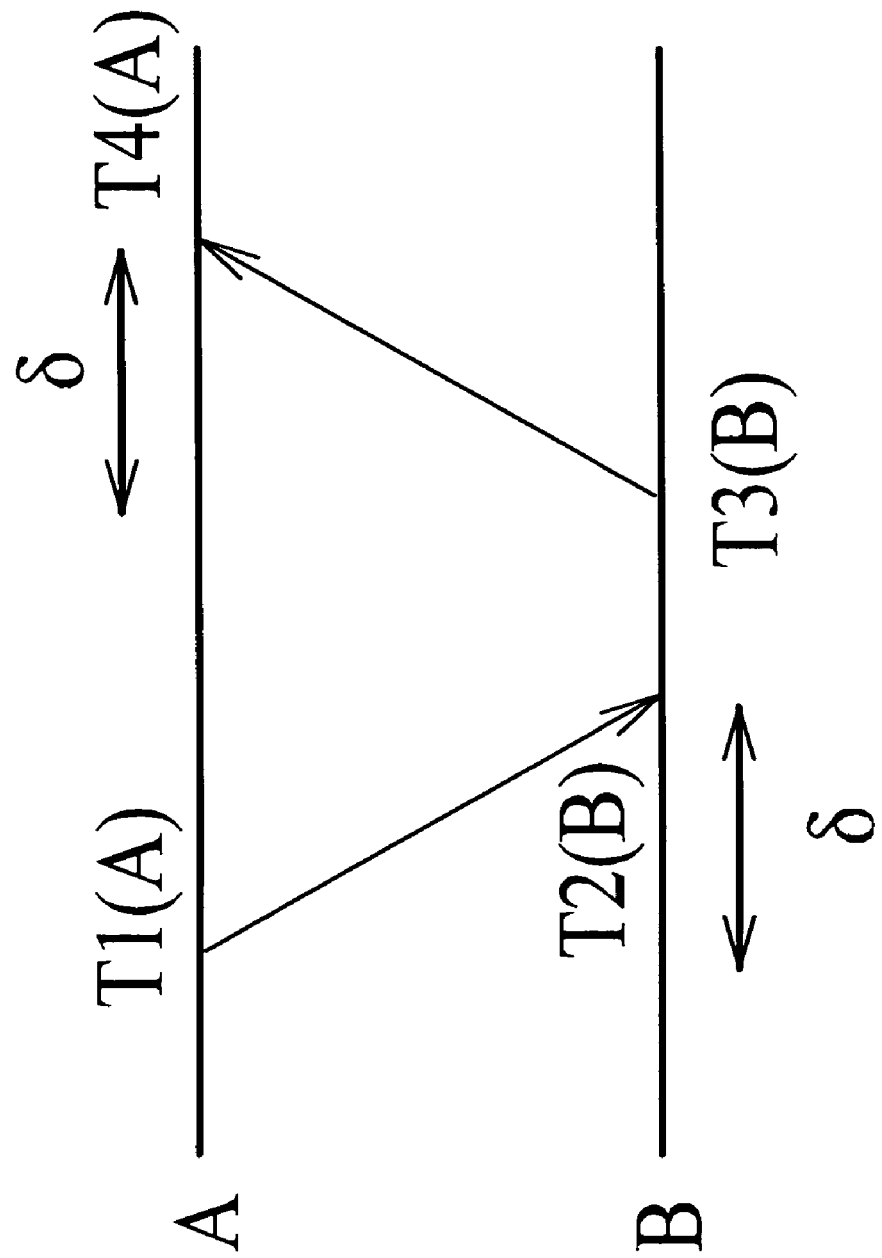
FIG. 2 illustrates message exchange for delta estimation between two nodes A and B.

We capture the uncertainty of MAC receive delay by measuring delta offline. This is achieved through an experimental method that emulates a sender-receiver synchronization handshake protocol. The experiment is shown in FIG. 2 where node A is the sender and node B the receiver. According to this experiment, node A sends a beacon at time T1(A), which is received by node B at time T2(B). Node B immediately replies with its own beacon at time T3(B) and node A receives this beacon at time T4(A). The times T1(A), T4(A) are measured with A's clock and the times T2(B), T3(B) with B's clock. T1(A) is the timestamp node A puts in its beacon.

FIG. 2 illustrates message exchange for delta estimation between two nodes A and B.

When B receives the beacon from A, it estimates the time when A transmitted (timestamped) the beacon as:

$$T1(B)=T2(B)-\delta \quad (4)$$

where delta is the parameter to be determined.

In addition, the offset between the two clocks is computed as:

$$\text{Offset}=T1(A)-T1(B) \quad (5)$$

At time T3(B), node B sends its own beacon but it timestamps it using its estimate of A's clock at T3(B), T3(A):

$$T3(A)=T3(B)+\text{Offset} \quad (6)$$

Note that this procedure is different from the online synchronization algorithm where all the nodes timestamp the beacons with the same value, i.e., the timestamp initially sent by the TR node. When A receives the reply at time T4(A), it estimates the instant T3'(A), the reply was sent as:

$$T3'(A)=T4(A)-\delta \quad (7)$$

Since both time instants T3(A) and T3'(A) are estimated with the same clock reference they should be equal:

$$T3'(A)=T3(A) \quad (8)$$

Substituting Equations (5) (6) (7) in Equation (8), we obtain the following expression for delta:

$$\delta = \frac{T4(A) - T3(B) + T2(B) - T1(A)}{2} \quad (9)$$

Based on Eq. (9), it is possible to estimate delta by measuring T1(A), T4(A) at node A and T2(B), T3(B) at node B.

The above experimental procedure should be repeated multiple times for each supported data rate to compute an average delta per data rate. During the clock synchronization algorithm execution, each node uses a look-up table to determine the delta corresponding to the data rate value in the received beacon packet.

During each slot of the SCS schedule, only a single node transmits and the rest of the nodes listen. This is a conservative schedule because there may be nodes far apart that can transmit at the same slot without conflict. However, in general it is not trivial to accurately estimate a priori which transmissions interfere, especially when interference relationships change dynamically during the protocol operation. Still, further parallelism and overhead reduction can be achieved by integrating clock synchronization with interference estimation algorithms to exploit spatial reuse. The interference estimation algorithm determines the non-interfering node sets and can be used in the design of the SCS schedule.

Figure 3:
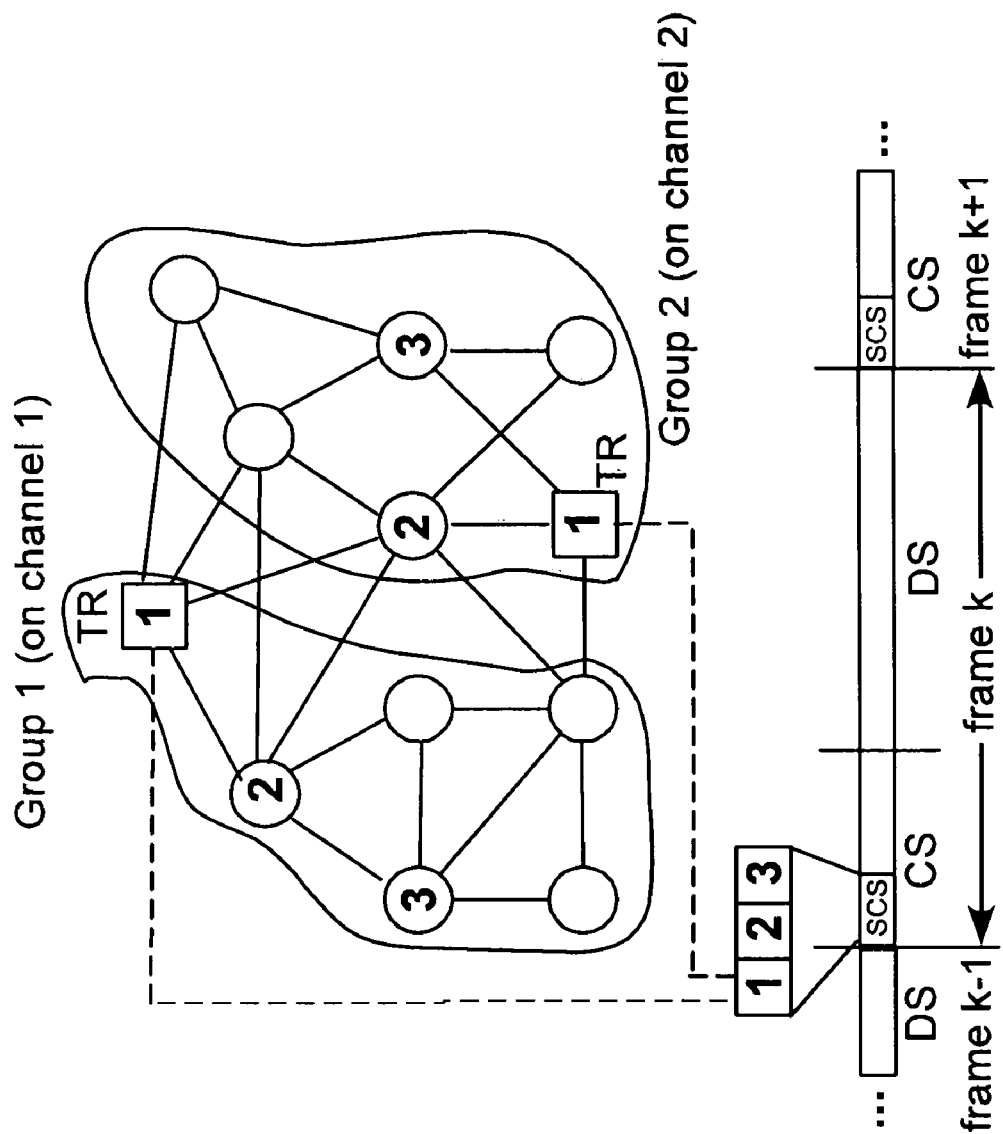
FIG. 3 represents an example of execution of the method according to the present invention, with 2 TR nodes and K=2 orthogonal channels.

The algorithm can operate with multiple TR nodes. Let M be the number of TR nodes. The network is partitioned in M groups, each served by a TR node. The group of TR node j is a connected subgraph of the network communication graph G(N,L). For each group j, a separate SCS of Pj slots is constructed. During the SCS of group j, the single TR node algorithm is executed, with a beacon message transmitted from the corresponding TR node. If only a single channel exists in the network, the M SCSs are placed sequentially within the control sub-frame, which implies that the algorithm will be executed sequentially across groups. If K orthogonal channels exist, then it is possible to reduce overhead by overlapping the algorithm executions in time (overlap factor of K). In this case, each SCS is associated with a channel number k and a time index t within the control sub-frame. Thus, at time index t of the control sub-frame, all nodes of group j switch to channel k and execute the synchronization algorithm. FIG. 3 illustrates an example of SCS structure and algorithm execution for the case of M=2 TR nodes and K=2 channels in the network of FIG. 1.

There could for instance be two channel numbers and one time index (t). In this configuration, one synchronization step is performed on each of the two channels at time index (t).

There could also for instance be one single channel number and two distinct time indexes. In this configuration, two synchronization steps are performed on said single channel at the two distinct time indexes.

FIG. 3 represents an example of execution of the method according to the present invention, with 2 TR nodes and K=2 orthogonal channels. The SCS of each group consists of P=3 slots. The two SCS can overlap in time because each group executes the algorithm on a different channel.

The above specification, examples and drawings provide a complete description of the method according to the present invention. Since many embodiments of the invention can be made without departing from the spirit and scope of the invention, the invention resides in the claims herein after appended.

The invention claimed is:

1. Method for synchronizing clocks of a set of nodes in a TDMA ("Time Division Multiple Access") multi-hop communication network comprising a plurality of nodes, among which some called time reference (TR) nodes are synchronized to a common time reference through a predetermined out-of-band synchronization mechanism, other nodes being called non-TR nodes, each node comprising an internal clock, the method comprising
transmitting, at the level of at least one of said TR nodes, a broadcast beacon packet during a given time slot of sub-frames, each sub-frame comprising a plurality of time slots;
propagating among the remaining nodes said beacon packet using the slotted structure of the TDMA protocol, each node being pre-assigned a conflict-free time slot in a sub-frame to broadcast said beacon packet received from another node in a previous slot of said sub-frame;
upon reception of said beacon packet by a first node from a second node, of estimating the time when the first node transmitted said beacon packet and
computing the offset between internal clock of the first node and internal clock of the second node; and
updating in at least two of said non-TR nodes the internal clock based on an updated offset estimate, upon reception of said beacon packet.

2. Method for synchronizing clocks of a set of nodes in a TDMA communication network according to claim 1, wherein said beacon packet comprises a timestamp with the current clock value of the TR node at the time when said beacon packet is transmitted by said TR node.

3. Method for synchronizing clocks of a set of nodes in a TDMA communication network according to claim 1, wherein additional control information is disseminated from at least one of said TR nodes to at least two said non-TR nodes in said communication network.

4. Method for synchronizing clocks of a set of nodes in a TDMA communication network according to claim 3, wherein said additional control information is disseminated in said beacon packet.

5. Method for synchronizing clocks of a set of nodes in a TDMA communication network according to claim 1, wherein said sub-frames are Synchronization Control Sub-Frames, which are part of control sub-frames.

6. Method for synchronizing clocks of a set of nodes in a TDMA communication network according to claim 1, wherein in a given time slot, only one node transmits and the remaining nodes are in "receive" mode.

7. Method for synchronizing clocks of a set of nodes in a TDMA communication network according to claim 1, wherein each time slot of said sub-frame is assigned to a node to transmit or propagate said beacon packet through said communication network.

8. Method for synchronizing clocks of a set of nodes in a TDMA communication network according to claim 7, wherein, when a node is assigned to transmit during a predetermined time slot of said sub-frame, at least one of its neighbor nodes has been assigned to transmit in the previous time slot.

9. Method for synchronizing clocks of a set of nodes in a TDMA communication network according to claim 1, further comprising maintaining and updating a look-up table by at least one node, said look-up table being used to determine a value, called delta value, depending on a data rate value in said beacon packet.

10. Method for synchronizing clocks of a set of nodes in a TDMA communication network according to claim 9, wherein said delta value is equal to the sum of the three following values:
MAC transmission delay at the sender;
propagation delay; and
MAC reception delay at the receiver.

11. Method for synchronizing clocks of a set of nodes in a TDMA communication network according to claim 1, further comprising providing a timestamp at a transmitting node at a communication network protocol layer called MAC (Media Access Control) layer.

12. Method for synchronizing clocks of a set of nodes in a TDMA communication network according to claim 1, further comprising, performed at a communication network protocol layer called MAC (Media Access Control) layer, receiving and decoding said beacon packet.

13. Method for synchronizing clocks of a set of nodes in a TDMA communication network according to claim 1, wherein at least two sub-frames are associated with at least one channel number k and at least one time index t within the sub-frame, and in that, at time index t, nodes that belong to a given group j of nodes switch to said channel k and perform at least one synchronization.

14. Method for synchronizing clocks of a set of nodes in a TDMA communication network according to claim 13, wherein there are two channel numbers and one time index t, and one synchronization is performed on each of the two channels at time index t.

15. Method for synchronizing clocks of a set of nodes in a TDMA communication network according to claim 13, wherein there is one single channel number and two distinct time indexes, and two synchronizations are performed on said single channel at the two distinct time indexes.

16. Method for synchronizing clocks of a set of nodes in a TDMA communication network according to claim 13, wherein said channel number k designates a communication channel among a plurality of orthogonal communication channels.

* * * * *